(12) United States Patent
Wang et al.

(10) Patent No.: US 12,112,463 B2
(45) Date of Patent: Oct. 8, 2024

(54) METHOD, DEVICE AND COMPUTER READABLE MEDIUM FOR INTRINSIC POPULARITY EVALUATION AND CONTENT COMPRESSION BASED THEREON

(71) Applicant: City University of Hong Kong, Hong Kong (CN)

(72) Inventors: Shiqi Wang, Hong Kong (CN); Kede Ma, Hong Kong (CN); Keyan Ding, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 352 days.

(21) Appl. No.: 17/447,447

(22) Filed: Sep. 13, 2021

(65) Prior Publication Data

US 2022/0084187 A1 Mar. 17, 2022

Related U.S. Application Data

(60) Provisional application No. 63/077,854, filed on Sep. 14, 2020.

(51) Int. Cl.
*G06T 3/40* (2024.01)
*G06N 3/08* (2023.01)
*G06T 7/00* (2017.01)

(52) U.S. Cl.
CPC .............. *G06T 7/0002* (2013.01); *G06N 3/08* (2013.01); *G06T 3/40* (2013.01);
(Continued)

(58) Field of Classification Search
CPC .................. G06T 7/0002; G06T 3/40; G06T 2207/20076; G06T 2207/20081;
(Continued)

(56) References Cited

U.S. PATENT DOCUMENTS 8,097,633 B2   1/2012  Rich
8,892,591 B1 * 11/2014  Haugen ................. G06F 16/338
                                                     707/723
(Continued)

FOREIGN PATENT DOCUMENTS

CN   107563394 A *  1/2018
CN   110222231 A *  9/2019 ............. G06F 16/73
(Continued)

OTHER PUBLICATIONS

Liu, Haojie, et al. "Gated context model with embedded priors for deep image compression." arXiv preprint arXiv:1902.10480 (2019). (Year: 2019).*

(Continued)

*Primary Examiner* — Chan S Park
*Assistant Examiner* — Woo C Rhim
(74) *Attorney, Agent, or Firm* — S&F/WEHRW

(57) ABSTRACT

The present application provides methods, devices and computer readable media for intrinsic popularity evaluation and content compression based thereon. In an embodiment, there is provided a method of intrinsic popularity evaluation. The method comprises: receiving an image from a social network; and determining an intrinsic popularity score for the image using a deep neural network (DNN) based intrinsic popularity assessment model.

9 Claims, 10 Drawing Sheets

(52) U.S. Cl.
CPC ............... *G06T 2207/20076* (2013.01); *G06T 2207/20081* (2013.01); *G06T 2207/20084* (2013.01); *G06T 2207/30168* (2013.01)

(58) Field of Classification Search
CPC ........... G06T 2207/20084; G06T 2207/30168; G06N 3/08; G06N 3/045; G06V 10/82; H04N 19/115; H04N 19/134
See application file for complete search history.

(56) References Cited

U.S. PATENT DOCUMENTS

| | | | |
|---|---|---|---|
| 8,922,400 B2 | 12/2014 | Gervais | |
| 9,084,753 B2 | 7/2015 | Rich | |
| 9,491,479 B2 | 11/2016 | Zhao | |
| 9,561,218 B2 | 2/2017 | Clarence-Smith et al. | |
| 2004/0105585 A1 | 6/2004 | Yokonuma | |
| 2008/0267501 A1* | 10/2008 | Keeney | H04N 19/162 375/E7.182 |
| 2011/0302103 A1 | 12/2011 | Carmel et al. | |
| 2012/0102410 A1* | 4/2012 | Gewecke | G06F 16/435 715/738 |
| 2015/0024839 A1* | 1/2015 | Zahn | A63F 13/00 463/31 |
| 2015/0067331 A1* | 3/2015 | Jelitto | H04L 63/0428 713/168 |
| 2015/0161517 A1 | 6/2015 | Bae et al. | |
| 2015/0215625 A1 | 7/2015 | Huang et al. | |
| 2016/0371293 A1* | 12/2016 | Luna | G06F 12/121 |
| 2017/0017652 A1* | 1/2017 | Neumeier | G06F 11/1464 |
| 2017/0323210 A1 | 11/2017 | Wang et al. | |
| 2018/0191800 A1* | 7/2018 | Henaire | H04L 65/611 |
| 2019/0095807 A1* | 3/2019 | Goswami | G06F 18/22 |
| 2019/0362367 A1 | 11/2019 | Wang et al. | |
| 2020/0351437 A1* | 11/2020 | Vasconcelos | H04N 23/62 |
| 2022/0254279 A1* | 8/2022 | Oonishi | G06F 16/335 |

FOREIGN PATENT DOCUMENTS

| | | | | |
|---|---|---|---|---|
| CN | 111339404 A | * | 6/2020 | ......... G06F 16/9535 |
| GB | 2540470 A | * | 1/2017 | ........... G06F 12/121 |
| WO | 99/52522 A1 | | 10/1999 | |
| WO | 2009/002935 A1 | | 12/2008 | |

OTHER PUBLICATIONS

Mazloom et al.; Multimodal popularity prediction of brand-related social media posts. ACM International Conference on Multimedia. pp. 197-201, 2016.

Almgren et al.; Predicting the future popularity of images on social networks. Multidisciplinary International Social Networks Conference on Social Informatics, Data Science. pp. 1-6, 2016.

Khosla et al.; What makes an image popular? International Conference on World Wide Web, pp. 867-876, 2014.

Ballé et al.; Variational image compression with a scale hyperprior. International Conference on Learning Representations, pp. 1-14, 2018.

Choi et al.; Variable rate deep image compression with a conditional autoencoder. International Conference on Computer Vision, pp. 3146-3154, 2019.

Minnen et al.; Joint autoregressive and hierarchical priors for learned image compression. Advances in Neural Information Processing Systems, pp. 10771-10780, 2018.

* cited by examiner

METHOD, DEVICE AND COMPUTER READABLE MEDIUM FOR INTRINSIC POPULARITY EVALUATION AND CONTENT COMPRESSION BASED THEREON

CROSS REFERENCE TO RELATED APPLICATIONS

This application claims the benefit of U.S. Provisional Patent Application No. 63/077,854 filed on Sep. 14, 2020, the disclosure of which is incorporated by reference herein in its entirety.

TECHNICAL FIELD

The present specification relates broadly, but not exclusively, to methods, devices, and computer readable media for intrinsic popularity evaluation and content compression based thereon.

BACKGROUND

Recent years have witnessed an accelerated proliferation of images/photos and videos being uploaded to various social network platforms (interchangeably referred to as social networks in the present application) such as Instagram, Flickr, and Reddit. Some images turn to be extremely popular, which gain millions of likes and comments, while some are completely ignored.

Conventional methods evaluate popularity of images by a combination of visual factors (e.g. visual content) and non-visual factors (e.g. user's statistics, upload time, caption, etc.). For example, absolute image popularity assessment (IPA) attempts to predict the number of received likes/comments of an image by combining all visual and non-visual factors.

However, visual factors and non-visual factors have different contributions in an image's popularity. It is noted that even for images uploaded by a same user at the same time, popularities of the images may be substantially different. Conventional methods that treat both visual and non-visual factors with same or similar importance may result in an inaccurate popularity evaluation/prediction.

In addition, without an accurate popularity evaluation/prediction, computational and/or storage resources of the various social network platforms cannot be allocated effectively, as it is difficult to provide a more popular content (e.g. images/photos and videos) with more computational and storage resources without an accurate popularity evaluation/prediction.

A need therefore exists to provide methods and devices that seek to overcome or at least minimize the above-mentioned problems so as to provide a more accurate popularity evaluation and a more efficient computational and/or storage resource management.

SUMMARY

According to an embodiment, there is provided a method of intrinsic popularity evaluation, the method comprising: receiving an image from a social network; and determining an intrinsic popularity score for the image using a deep neural network (DNN) based intrinsic popularity assessment model.

According to another embodiment, there is provided a method of content compression, the method comprising: compressing information with a variable compression rate corresponding to an intrinsic popularity score of a content of the information.

According to another embodiment, there is provided a device for intrinsic popularity evaluation, the device comprising: at least one processor; and a memory including computer program code for execution by the at least one processor, the computer program code instructs the at least one processor to: receive an image from a social network; and determine an intrinsic popularity score for the image using a deep neural network (DNN) based intrinsic popularity assessment model.

According to another embodiment, there is provided a device for content compression, the device comprising: at least one processor configurable to allocate resources; and a memory including computer program code for execution by the at least one processor, the computer program code instructs the at least one processor to allocate resources by: compressing information with a variable compression rate corresponding to an intrinsic popularity score of a content of the information.

According to another embodiment, there is provided a device for content compression, comprising: a core autoencoder including an analysis transformation and a synthesis transformation to learn a quantized latent representation of a content of information; and a hyper autoencoder arranged to learn a probabilistic model over the quantized latent representation of the content learned in the core autoencoder; wherein the content is processed by both the core autoencoder and the hyper autoencoder to generate a compressed content of the information, and wherein the core autoencoder and the hyper autoencoder are composed of multiple layers of conditional convolution, generalized divisive normalization (GDN), and inverse GDN, wherein the multiple layers of conditional convolution are conditioned on an intrinsic popularity score of the content of the information determined using a deep neural network (DNN) based intrinsic popularity assessment model.

According to yet another embodiment, there is provided a non-transitory computer readable storage medium having instructions encoded thereon that, when executed by a processor, cause the processor to perform one or more steps in a method of intrinsic popularity evaluation as described herein.

BRIEF DESCRIPTION OF THE DRAWINGS

Embodiments and implementations are provided by way of example only, and will be better understood and readily apparent to one of ordinary skill in the art from the following written description, read in conjunction with the drawings, in which:

FIG. 9 shows a diagram 900 depicting accuracy of popularity evaluation conducted on a testing set of popularity-discriminable image pairs (PDIPs) based on various popularity evaluation methods. It is shown that the intrinsic popularity evaluation 914 as described in the present application has achieved a highest accuracy at 76.65% among seven (7) popularity evaluation methods.

FIG. 10 shows a diagram 1000 depicting a normalised histogram of intrinsic popularity scores for a testing set of 5000 popularity-discriminable image pairs (PDIPs) based on the method of intrinsic popularity evaluation according to an embodiment. It is shown that the normalised histogram of the intrinsic popularity scores fits into a Gaussian curve 1002.

FIG. 11 shows examples of images with different intrinsic popularity levels. For the sake of simplicity, some images are resized without keeping aspect ratios for neat display. In an embodiment, the respective intrinsic popularity scores of these images determined by the methods of intrinsic popularity evaluation as described herein are classified into five (5) intrinsic popularity levels: (a) excellent, (b) good, (c) fair, (d) bad, and (e) poor. For example, the excellent level may cover an intrinsic popularity score range of 6 and above. The good level may cover an intrinsic popularity score range of 4 to 6. The fair level may cover an intrinsic popularity score range of 2-4. The bad level may cover an intrinsic popularity score range of 0 to 2. The poor level may cover an intrinsic popularity score range of 0 and below.

FIG. 12 shows a diagram 1200 depicting heatmaps of sample images generated by Grad-CAM. In the diagram 1200, a front row 1202 shows images of high intrinsic popularity, e.g. with intrinsic popularity scores in a range of 4 and above. A second row 1204 shows images of low intrinsic popularity, e.g. with intrinsic popularity scores in a range of 2 and below. It is shown from the diagram 1200 that a warmer region in a visual content of an image contributes more to the image's intrinsic popularity.

Figure 1:
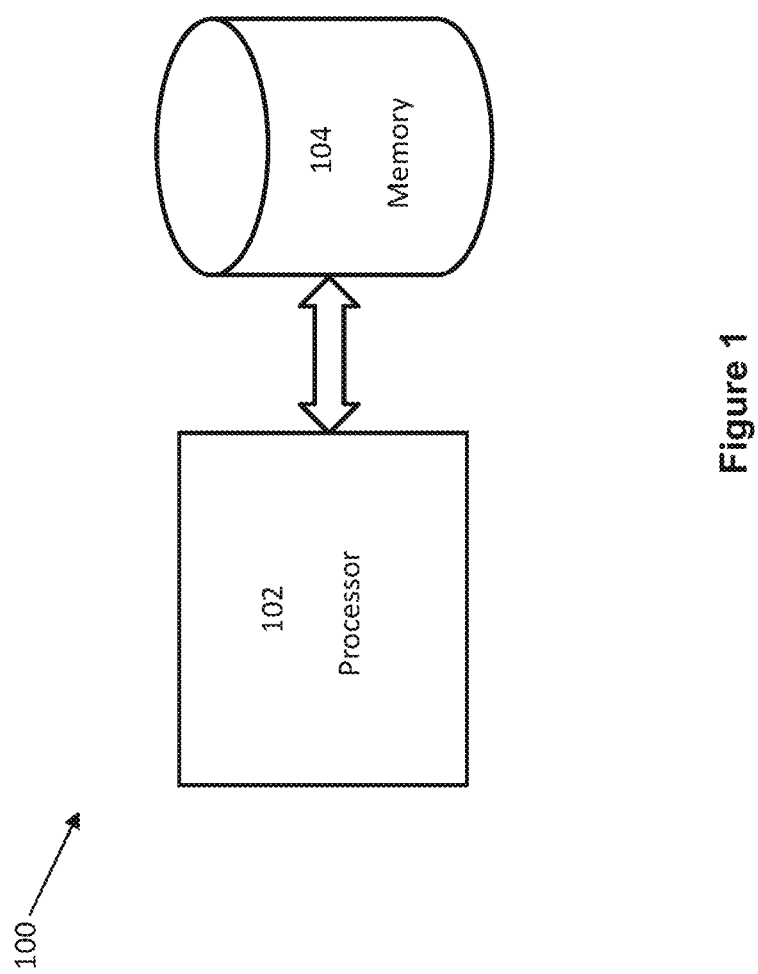
FIG. 1 is a schematic diagram of a device 100. In an embodiment, the device can be implemented as a device for intrinsic popularity evaluation. In another embodiment, the device can be implemented as a device for content compression.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "determining", "training", "retrieving", "constructing", "determining", "optimising", "compressing", "classifying", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the present application provide approaches that emphasize on visual content of images to evaluate intrinsic popularity and thereby provide a more accurate popularity evaluation for the images and a more efficient computational and/or storage resource management for various social network platforms based on the intrinsic popularity evaluation.

It is understandable to those skilled in the art that the intrinsic popularity evaluation in the present application aims to provide accurate popularity predictions for one or more images on a social network by determining intrinsic popularity scores for the one or more images. In this regard, intrinsic popularity evaluation can be interchangeably referred to as intrinsic popularity prediction in the present application.

FIG. 1 illustrates a schematic diagram of a device 100. In an embodiment, the device can be implemented as a device for intrinsic popularity evaluation. In another embodiment, the device can be implemented as a device for content compression.

The device 100 at least includes one or more processor 102 and a memory 104. The at least one processor 102 and the memory 104 are interconnected. The memory 104 includes computer program code (not shown in FIG. 1) for execution by the at least one processor 102.

Figure 2:
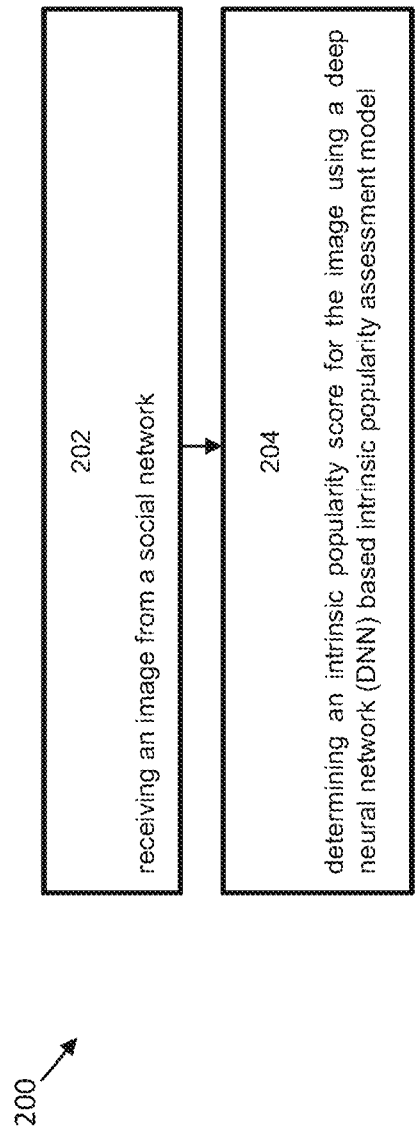
FIG. 2 is a flow chart illustrating a method 200 for intrinsic popularity evaluation, according to an embodiment.

In an embodiment where the device 100 is implemented as a device for intrinsic popularity evaluation, the computer program code instructs the at least one processor 102 to perform the steps for intrinsic popularity evaluation as shown in FIG. 2 and described in the present application.

At step 202, the computer program code instructs the at least one processor 102 to receive an image from a social network. An example of the image is shown in FIG. 3.

Figure 3:
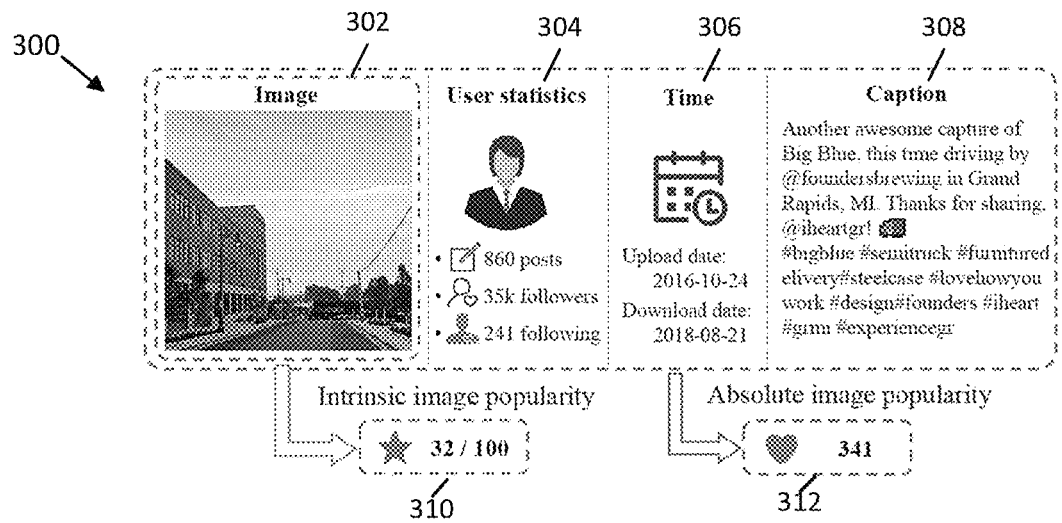
FIG. 3 shows a diagram 300 depicting an embodiment of content on a social network. In this embodiment, the content 300 is an image posted by a user. The image 300 comprises a visual content 302 and a plurality of attributes. In the present embodiment, the attributes include user statistics 304, upload/download time 306, and caption content 308.

In FIG. 3, a diagram 300 depicts an embodiment of content on a social network. In this embodiment, the content 300 is an image posted by a user. The image 300 comprises a visual content 302 and a plurality of attributes. The attributes of the image 300 indicate social and textual information of the image 300. In this embodiment, the attributes include user statistics 304, upload/download time 306, and caption content 308. The user statistics 304 may include user ID, number of posts of the user, number of follower accounts of the user, number of following accounts of the user, etc. Additionally or alternatively, the attributes of the image 300 may include other information such as a Uniform Resource Locator (URL) web address of the image 300 (interchangeably referred to as "post URL" in the present application for the sake of simplicity), a type of the visual content 302 (for example, a building, a street view, etc), number of comments, number of hashtags, number of @ signs, and etc. It is appreciable to those skilled in the art that the attributes of the image 300 may include further information.

Figure 5:
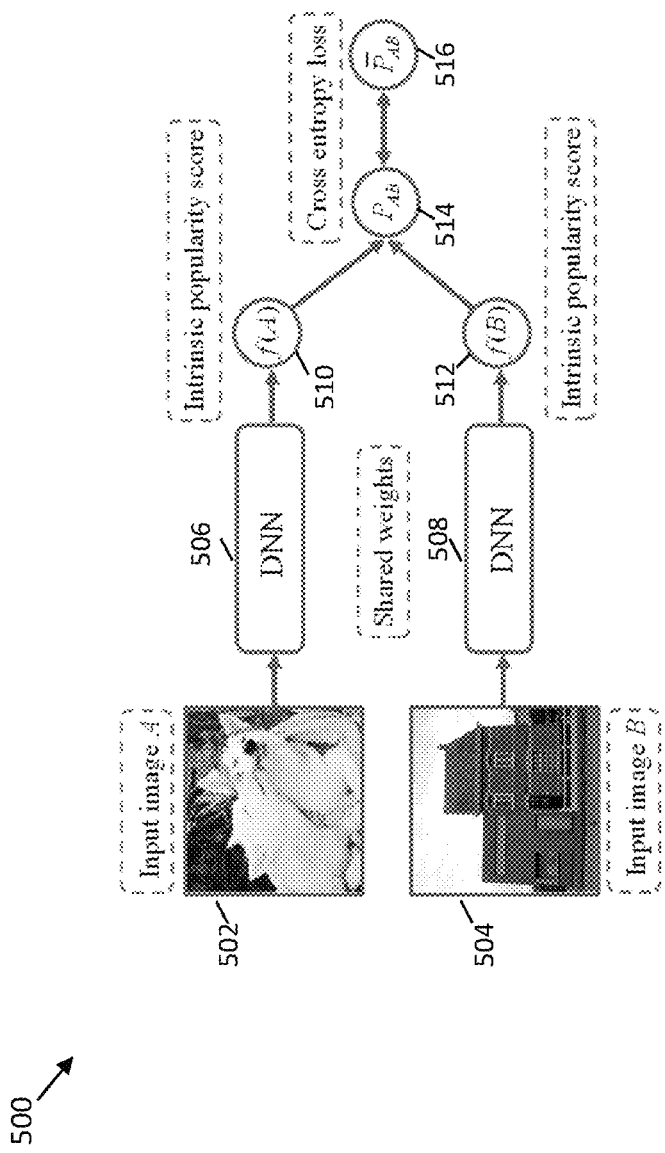
FIG. 5 shows a diagram 500 depicting an embodiment of a deep neural network (DNN) based intrinsic popularity assessment model trained with a plurality of popularity-discriminable image pairs (PDIPs).

At step 204, the computer program code instructs the at least one processor 102 to determine an intrinsic popularity score for the image using a deep neural network (DNN) based intrinsic popularity assessment model. An embodiment of the DNN based intrinsic popularity assessment model is depicted in FIG. 5 and described in the corresponding paragraphs.

In some embodiments, the intrinsic popularity score for the image is associated with a visual content of the image. As shown in FIG. 3, in this manner, the visual content 302 of the image 300 can be relied solely for intrinsic popularity evaluation 310, which arrives at an intrinsic popularity score of 32 (with a re-scaled maximum score of 100). On the other hand, a conventional absolute image popularity assessment takes both the visual factor (e.g. visual content 302 of the image 300) and non-visual factors (e.g. the attributes 304, 306, 308 of the image 300) into consideration to predict the number of received likes for the image 300 to be 341. It therefore shows the intrinsic popularity evaluation/assessment in the present application which treats visual factor (e.g. visual content 302 of the image 300) with more importance can advantageously achieve a more direct intrinsic popularity score and a more accurate popularity prediction.

In some other embodiments, in addition to the visual content of the image, the intrinsic popularity score for the image can be further associated with one or more of the attributes as described above based on practical needs and/or requirements.

Prior to step 204, the DNN based intrinsic popularity assessment model is trained. During the training, the computer program code instructs the at least one processor 102 to retrieve a plurality of historical images. In some embodiments, the plurality of historical images can be retrieved from the same social network as the image 300. It is appreciable to those skilled in the art that the plurality of historical images used in the training may be retrieved from one or more different social networks. For example, the plurality of historical images can be retrieved from over 200 million distinctive posts crawled from Instagram. In some embodiments, one historical image can be only involved in one PDIP to ensure diversity of the training.

Based on the plurality of historical images, a plurality of popularity-discriminable image pairs (PDIPs) can be constructed. The construction of the plurality of PDIPs is in a manner that each PDIP in the plurality of PDIPs comprises a first image and a second image and that the first image has a probability of higher intrinsic popularity than the second image.

In an embodiment, the construction of the plurality of PDIPs can be performed in the following manner. Considering a log-scaled number of likes S received for an image as a ground truth for absolute image popularity of the image, the following two assumptions are made.

First assumption: S obeys a normal distribution $$p(S|\mu) \propto \exp\left(-\frac{(S-\mu)^2}{2\sigma^2}\right) \quad (1)$$

with mean μ and standard deviation a. In equation (1), μ is a random variable, which can be viewed as the average number of likes received by an image in the log scale. p(μ) is assumed to be flat with a finite positive support. To simplify the derivation, σ is treated as a positive constant to be determined.

Second assumption: Intrinsic popularity Q is a monotonically increasing function of μ. Using Bayes' theorem, $$p(\mu|S) \propto p(S|\mu)p(\mu) \propto p(S|\mu), \quad (2)$$

where the second proportion follows from the first assumption that p(μ) is flat. That is, conditioning on S, μ is Gaussian with mean S and standard σ.

To ensure that the first image A is intrinsically more popular than the second image B in a PDIP, the following probability is computed:

$$P(Q_A \geq Q_B|S_A,S_B) = P(\mu_A \geq \mu_B|S_A,S_B) = P(\mu_A - \mu_B \geq 0|S_A,S_B), \quad (3)$$

where equation (3) follows the second assumption that intrinsic popularity Q is a monotonically increasing function of μ. Assuming variability of intrinsic popularities across images is uncorrelated, and conditioning on $S_A$ and $S_B$, the difference $\mu_{AB} = \mu_A - \mu_B$ is also Gaussian:

$$p(\mu_{AB}|S_A,S_B) \propto \exp\left(-\frac{(\mu_{AB} - (S_A - S_B))^2}{4\sigma^2}\right). \quad (4)$$

Combining equation (3) with equation (4), $$P(Q_A \geq Q_B|S_A,S_B) = \Phi\left(\frac{S_A - S_B}{\sqrt{2}\,\sigma}\right), \quad (5)$$

where $\Phi(\cdot)$ is the standard normal cumulative distribution function. $P(Q_A \geq Q_B|S_A,S_B)$ indicates a probability that Image A is intrinsically more popular than Image B. In some embodiments, a large threshold T is chosen to ensure the popularity discriminability of the plurality of PDIPs, i.e., $P(Q_A \geq Q_B|S_A,S_B) \geq T$.

Figure 4:
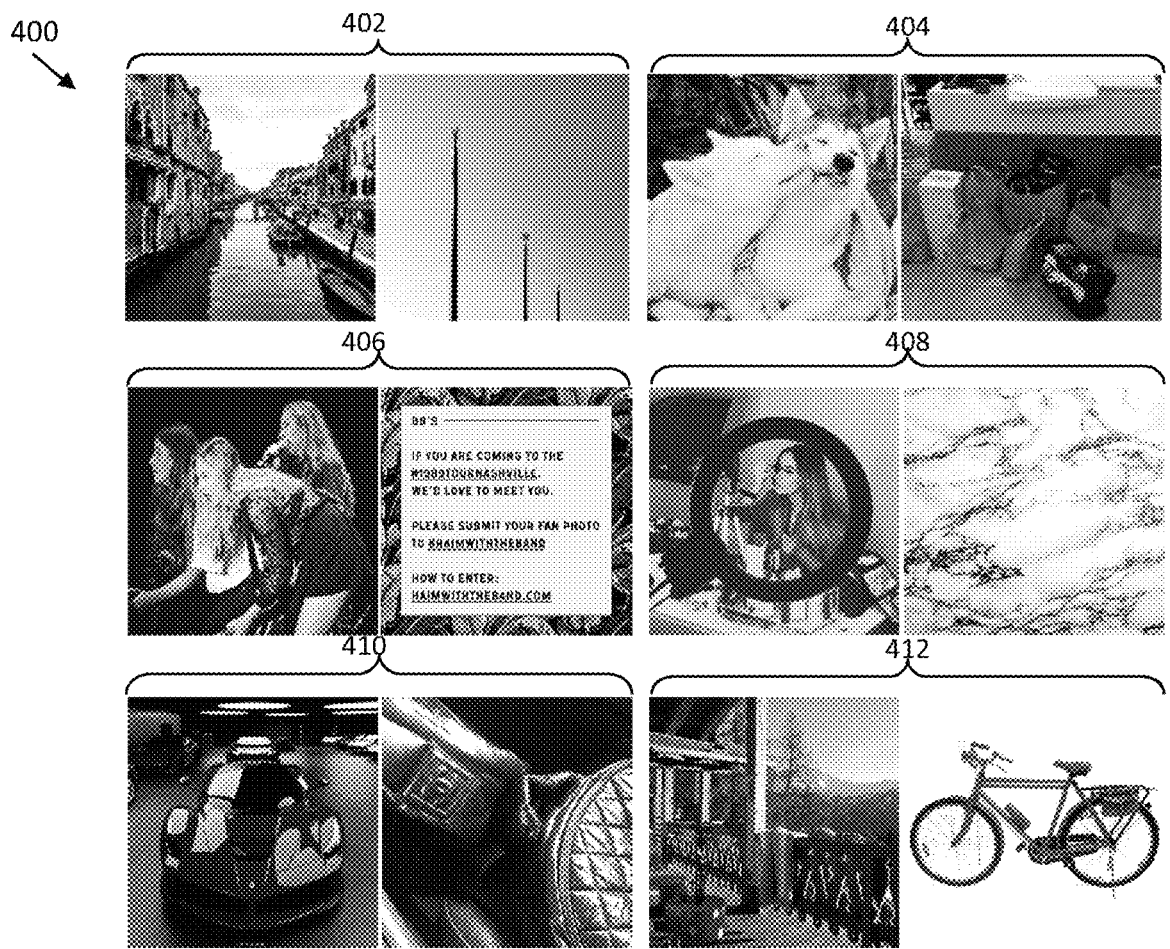
FIG. 4 shows a diagram 400 depicting an embodiment of popularity-discriminable image pairs (PDIPs).

FIG. 4 shows a diagram 400 depicting an embodiment of popularity-discriminable image pairs (PDIPs) as constructed above. In this embodiment 400 shows six (6) popularity-discriminable image pairs (PDIPs) 402, 404, 406, 408, 410, 412. In each PDIP 402, 404, 406, 408, 410, 412, the left image in each pair is expected to be intrinsically more popular than the right image based on the above equation (5). Such an expectation is confirmed by a psychophysical experiment conducted to prove effectiveness of the methods for intrinsic popularity evaluation. It is understandable that the embodiment in FIG. 4 only shows a portion of the popularity-discriminable image pairs (PDIPs) for the sake of simplicity.

In some embodiments, the construction of the plurality of PDIPs may take non-visual factors into consideration in addition to the requirement that the first image in each PDIP has a probability of higher intrinsic popularity than the second image, e.g., $P(Q_A \geq Q_B|S_A,S_B) \geq T$. For example, it may be desirable for the first image and the second image in a PDIP to have similar textual and social contexts. Such non-visual factors can be fulfilled by selecting two images that are associated with the same one or more attributes in addition to requiring one of the two images intrinsically more popular than the other image of the two images when constructing a PDIP.

The non-visual factors are described above as one or more attributes of an image, which include user statistics, upload/download time, caption content, post URL, a type of visual content of the image (for example, a beach, a dog, a building, a street view, etc), number of comments, number of hashtags, and/or number of @ signs. The user statistics may include user ID, number of posts of the user, number of follower accounts of the user, number of following accounts of the user, etc.

Different users have different numbers of followers. As such, images posted by the users with more followers have higher chances of receiving more likes. Considering such influence of user statistics, the construction of the plurality of PDIPs may further require images used for PDIP construction to be from a same user.

A user often has a different number of followers at different times. To reduce influence of uploading time, the construction of the plurality of PDIPs may further require the post time difference of two images in a PDIP to a maximum of ten days. In addition, images just uploaded to a social network is preferable to be disregarded, as the number of likes has not reached a saturation value. As such, the construction of the plurality of PDIPs may further require excluding images posted within one month.

Captions of images have a noticeable influence on image popularity, especially those containing hashtags and @ signs. A hot hashtag contributes significantly to image popularity because of the extensive exposure to viewers beyond followers. To remove the textual bias, the construction of the plurality of PDIPs may further require the hashtag and @ sign of the images in a PDIP to be the same in terms of both content and number. Moreover, the construction of the plurality of PDIPs may further require the length of the caption (excluding the hashtag and @ sign) to be restricted to a maximum of six words.

In view of the above, the construction of the plurality of PDIPs requires the first image in each PDIP to have a probability of higher intrinsic popularity than the second image, e.g., $P(Q_A \geq Q_B|S_A,S_B) \geq T$, with one or more additional requirements that the two images in each PDIP have to be from the same user, posted more than one month and within ten days, and/or having a caption with a maximum of six words and the same hashtag/@ sign(s). Based on the practical requirements, the one or more additional requirements may be optional in some embodiments or essential in some other embodiments.

Thereafter, the computer program code instructs the at least one processor 102 to train the DNN based intrinsic popularity assessment model 500 with the plurality of PDIPs. An embodiment of the DNN based intrinsic popularity assessment model 500 trained with the plurality of PDIPs is shown in FIG. 5.

As shown in FIG. 5, for each PDIP 502, 504 of the plurality of PDIPs, the computer program code instructs the at least one processor 102 to determine a first intrinsic popularity score 510 for the first image 502 and a second intrinsic popularity score 512 for the second image 504 using the DNN based intrinsic popularity assessment model 500, and optimise the DNN based intrinsic popularity assessment model 500 by minimizing a binary cross entropy loss between a score difference $P_{AB}$ between the first intrinsic popularity score 510 and the second intrinsic popularity score 512 and a ground truth binary label $\overline{P}_{AB}$ denoting whether the first image 502 is intrinsically more popular than the second image 504.

As shown in FIG. 5, the DNN based intrinsic popularity assessment model 500 is configured in a Siamese architecture, which includes two same DNNs 506, 508 each denoted as $f$. In an embodiment, a RGB image is provided to a first DNN 506 as the first image 502 (input image A) of a PDIP, which produces a first intrinsic popularity score $Q_A=f(A)$ as an output of the first DNN 506. Analogously, another RGB image is provided to a second DNN 508 as the second image 504 (input image 8) of the PDIP, which produces a second intrinsic popularity score $Q_B=f(B)$ as an output of the second DNN 508.

In some embodiments, each of the two DNNs 506, 508 is implemented by a 50-layer residual network, for example, ResNet-50. It is appreciable to those skilled in the art that the two DNNs can be implemented by other deep neural networks. The two DNNs 206, 508 may share same weights during training and testing. A score difference between the first intrinsic popularity score $Q_A$ and the second intrinsic popularity score $Q_B$ is calculated as $O_{AB}=f(A)-f(B)$, and converted to a probability $P_{AB}$ using a logistic function $$P_{AB} = \frac{\exp(O_{AB})}{1+\exp(O_{AB})}. \tag{6}$$

The ground truth binary label $\overline{P}_{AB}$ of the PDIP denotes whether the first image 502 is intrinsically more popular than the second image 504. $\overline{P}_{AB}=1$ indicates the first image 502 is intrinsically more popular than the second image 504 and otherwise $\overline{P}_{AB}=0$.

The binary cross entropy loss between the score difference $P_{AB}$ and the ground truth binary label $\overline{P}_{AB}$ is defined as the following loss function:

$$l = -\overline{P}_{AB} \log P_{AB} - (1-\overline{P}_{AB})\log(1-P_{AB}) = -\overline{P}_{AB}O_{AB}+\ln(1+\exp(O_{AB})). \tag{7}$$

By minimizing the binary cross entropy loss l, the DNN based intrinsic popularity assessment model 500 is optimised.

After training, the DNN 506, 508 $f$ is optimised as $f^*$ in the intrinsic popularity assessment model 500. Given an image X, an intrinsic popularity score of the image X can be determined at either DNN 506, 508 of the DNN based intrinsic popularity assessment model 500 as $Q_X=f^*(X)$.

The above described embodiments of intrinsic popularity evaluation advantageously provide a more accurate popularity prediction for images on various social networks as compared to conventional absolute popularity evaluation methods, as described with reference to experimental data shown in FIGS. 9 to 12. Such a more accurate popularity prediction in turn can facilitate a more efficient computational and/or storage resource management for various social networks.

For example, efficient compression of information is crucial for either local or cloud data storage. In the present application, the intrinsic popularity scores determined by the intrinsic popularity evaluation further serve as a guidance to optimize content compression from the perspective of ultimate utility. In other words, the present application allocates more resources to information having contents with high popularity scores, such that contents (e.g., images) that are potentially viewed more frequently are allocated with more coding bits. That is, contents of higher popularity are compressed with lower compression rates.

Figure 6:
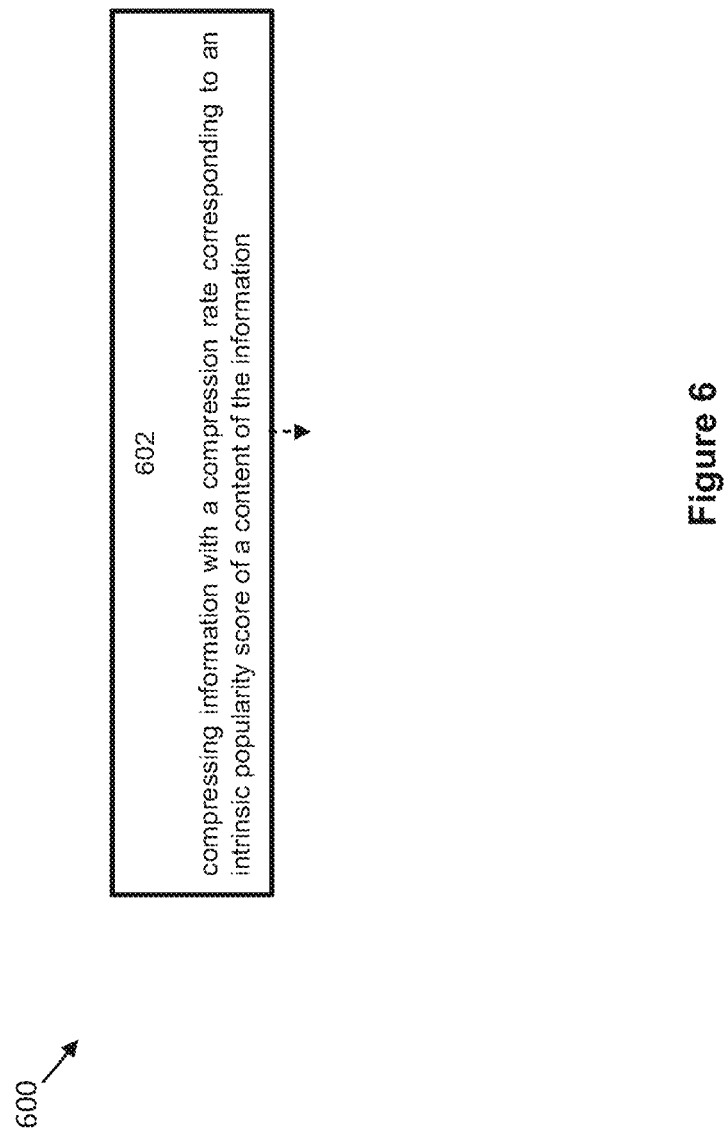
FIG. 6 is a flow chart illustrating a method 600 for content compression, according to an embodiment.

In an embodiment where the device 100 is implemented as a device for content compression, the computer program code instructs the at least one processor 102 to allocate resources by performing the steps in the exemplified method 600 for content compression as shown in FIG. 6 and described in the present application.

At step 602, the computer program code instructs the at least one processor 102 to compress information with a variable compression rate corresponding to an intrinsic popularity score of a content of the information.

In some embodiments, the content of the information comprises an image. In some embodiments, the intrinsic popularity score of the image is determined using a deep neural network (DNN) based intrinsic popularity assessment model as described above with reference to the methods of intrinsic popularity evaluation. In these embodiments, the step of compressing of the information comprises: classifying the intrinsic popularity score into a popularity level and compressing the image with the variable compression rate, which is corresponding to the popularity level. In these embodiments, the variable compression rate is in a negative correlation to the corresponding intrinsic popularity score.

In some embodiments, there may be five (5) intrinsic popularity levels: (a) excellent, (b) good, (c) fair, (d) bad, and (e) poor. The excellent level may cover an intrinsic popularity score range of 6 and above. The good level may cover an intrinsic popularity score range of 4 to 6. The fair level may cover an intrinsic popularity score range of 2-4. The bad level may cover an intrinsic popularity score range of 0 to 2. The poor level may cover an intrinsic popularity score range of 0 and below. For example, if the image has an intrinsic popularity score of 5, the intrinsic popularity score is classified into the good level and the image is compressed with a variable compression rate corresponding to the intrinsic popularity score and in turn the good level. Such a variable compression rate is in a negative correlation to the corresponding intrinsic popularity score. In this manner, different images of different popularities can have different compression rates. In other words, images with higher intrinsic popularity scores are compressed with lower compression rates so that images that are more popular are compressed with less loss. It is appreciable to those skilled in the art that the intrinsic popularity score ranges described above are for exemplary purposes. The intrinsic popularity score ranges may vary based on practical needs and requirements.

In some embodiments, the variable compression rate of the image is achieved based on a popularity based conditional convolution CConv:

$$CConv=W(s)\times Conv+b(s), \tag{8}$$

wherein $W(s)=softplus(u\times s)$ and $b(s)=v\times s$, wherein s is the popularity level of the image encoded by a one-hot vector, $W(s)$ is a channel-wise scaling factor performed on a general convolution (Conv), $b(s)$ is a bias term performed on the general convolution (Conv), and u and v are learnable weights of fully connected layers in a DNN based autoencoder.

Figure 7:
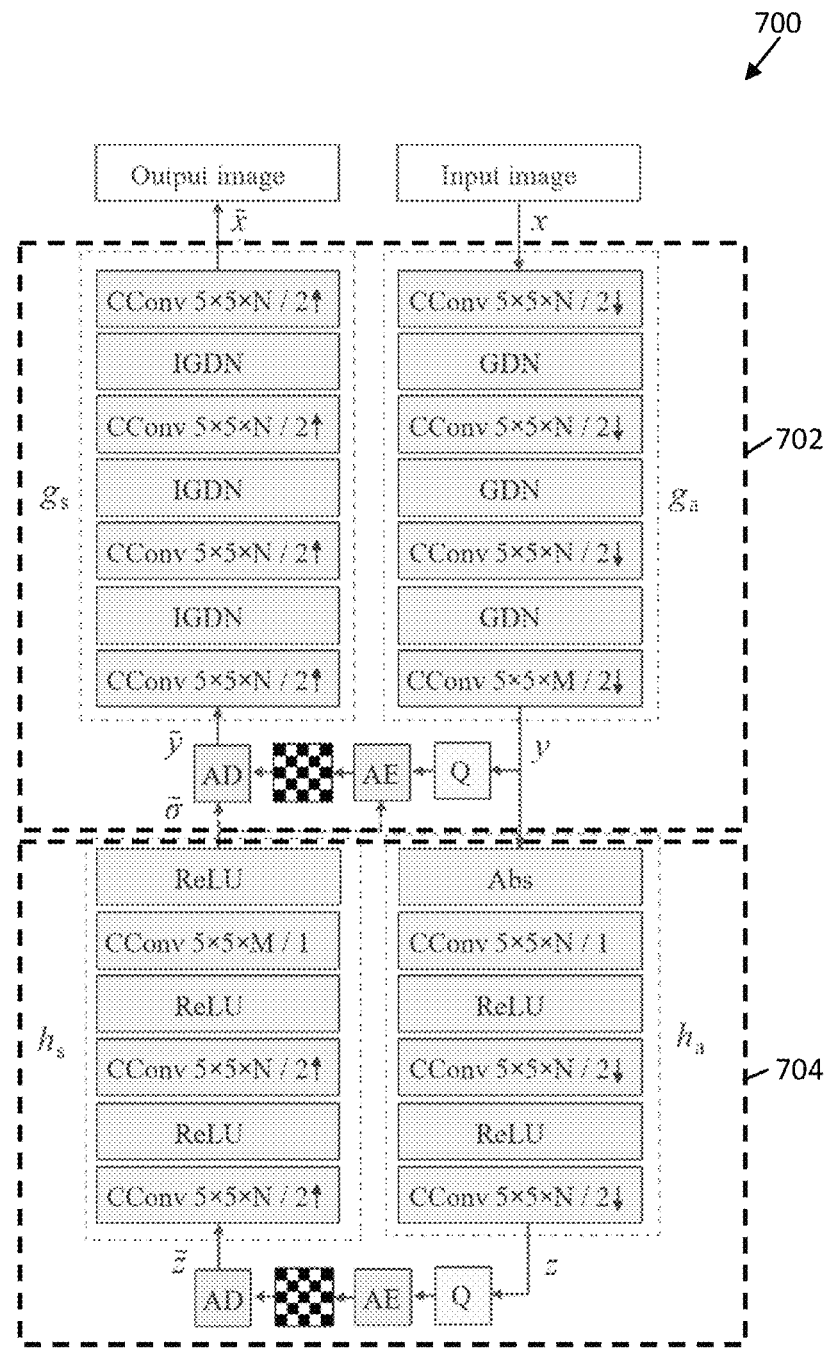
FIG. 7 is a schematic diagram of a device 700 for content compression, according to an embodiment.

Another embodiment of a device 700 for content compression is depicted in FIG. 7. As shown in FIG. 7, the device 700 is a DNN-based autoencoder for variable rate compression. The device 700 comprises a core autoencoder 702 including an analysis transformation $g_a$ and a synthesis transformation $g_s$ to learn a quantized latent representation of a content x of information and a hyper autoencoder 704 arranged to learn a probabilistic model over the quantized latent representation of the content learned in the core autoencoder 702. Similar to the core autoencoder 702, the hyper autoencoder 704 can also include an analysis transformation $h_a$ and a synthesis transformation $h_s$. The content x is processed by both the core autoencoder 702 and the hyper autoencoder 704 to generate a compressed content x̃ of the information. The core autoencoder 702 and the hyper autoencoder 704 are trained by one or more deep neural networks (DNNs) includes one or more layers of conditional convolution, wherein the one or more layers of conditional convolution are conditioned on an intrinsic popularity score of the content x of the information determined using a deep neural network (DNN) based intrinsic popularity assessment model.

In the embodiment of device 700 shown in FIG. 7, Q box represents quantization. AE box and AD box represent an arithmetic encoder and an arithmetic decoder, respectively. CConv denotes conditional convolution as described above that are conditioned on an intrinsic popularity score of the content x of the information. Convolution parameters in the one or more layers of conditional convolution of the one or more DNNs are denoted as: kernel support height×kernel support width×number N or M of filters/down- or up-sampling stride, where ↑ indicates upsampling and ↓ indicates downsampling. In the embodiment, each of the kernel support height and kernel support width is set as 5, N=128 and M=192. GDN indicates a generalized divisive normalization, and IGDN is an inverse GDN.

As described above, in some embodiments, the content of the information comprises an image x. The variable compression rate of the image is achieved as described above based on a popularity based conditional convolution CConv according to equation (8).

The objective function is a weighted sum of two terms that quantify a coding cost and a reconstruction error, respectively:

$$\mathcal{L} = \mathcal{L}_r + \lambda \mathcal{L}_d, \quad (9)$$

wherein the Lagrange multiplier λ controls rate-distortion trade-off, which is known as rate-distortion optimization (RDO) functions in conventional codecs. Rate loss representing the bit consumption of the autoencoder 700 is defined by $$\mathcal{L}_r = \mathbb{E}_{x \sim p_x}[-\log_2 p_{\tilde{y}}(\tilde{y})] + \mathbb{E}_{x \sim p_x}[-\log_2 p_{\tilde{z}}(\tilde{z})]. \quad (10)$$

The distortion loss is the mean square error between the input image x and the reconstructed image x̃:

$$\mathcal{L}_d = \mathbb{E}_{x \sim p_x} \|x - \tilde{x}\|_2^2. \quad (11)$$

In general, the Lagrange multiplier λ is a constant that represents the slope of the rate-distortion (RD) curve, but in equation (9), λ is a monotonic increasing function of the popularity level s:

$$\lambda = \alpha \cdot \text{sigmoid}(s) \quad (12)$$

where α is a constant. In this manner, images of higher popularity levels will have larger λ, resulting in more bits being allocated to popular images. In this manner, a more efficient computational and/or storage resource management is advantageously achieved.

Figure 8:
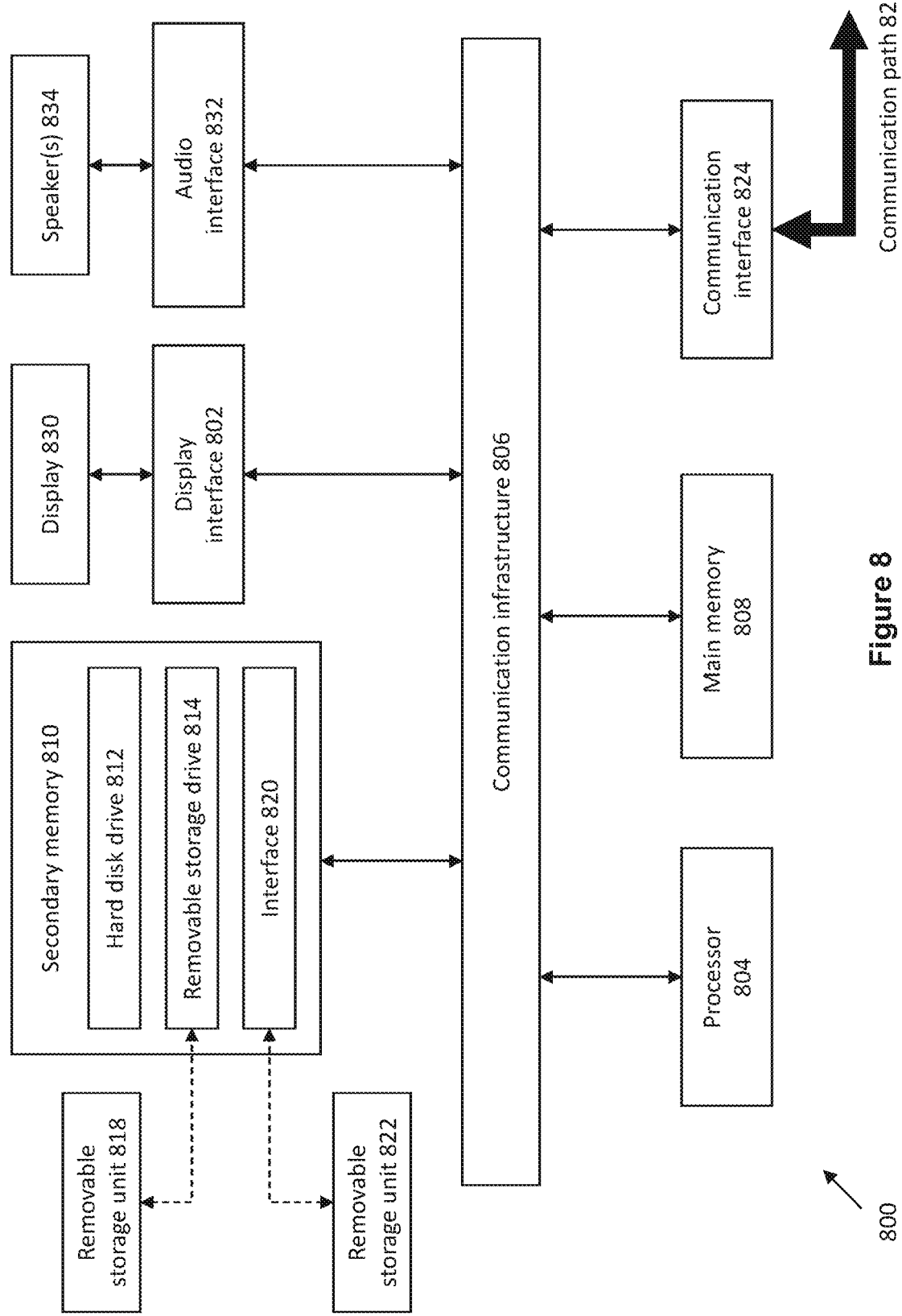
FIG. 8 shows a block diagram of a computer system 800 suitable for use as a device 100 as exemplified in FIG. 1, which in some embodiments can be implemented as a device for intrinsic popularity evaluation and in some other embodiments can be implemented as a device for content compression as described herein.

FIG. 8 shows a block diagram of a computer system 800 suitable for use as a device 100 as exemplified in FIG. 1, which in some embodiments can be implemented as a device for intrinsic popularity evaluation and in some other embodiments can be implemented as a device for content compression as described herein.

The following description of the computer system/computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a hard disk drive 812 and/or a removable storage drive 814, which may include a magnetic tape drive, an optical disk drive, or the like. The removable storage drive 814 reads from and/or writes to a removable storage unit 818 in a well-known manner. The removable storage unit 818 may include a magnetic tape, optical disk, or the like, which is read by and written to by removable storage drive 814. As will be appreciated by persons skilled in the relevant art(s), the removable storage unit 818 includes a computer readable storage medium having stored therein computer executable program code instructions and/or data.

In an alternative implementation, the secondary memory 810 may additionally or alternatively include other similar means for allowing computer programs or other instructions to be loaded into the computing device 800. Such means can include, for example, a removable storage unit 822 and an interface 820. Examples of a removable storage unit 822 and interface 820 include a removable memory chip (such as an EPROM or PROM) and associated socket, and other removable storage units 822 and interfaces 820 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments, the communication interface 824 permits data to be transferred between the computing device 800 and a data communication network, such as a public data or private data communication network. The communication interface 824 may be used to exchange data between different computing devices 800 which such computing devices 800 form part an interconnected computer network. Examples of a communication interface 824 can include a modem, a network interface (such as an Ethernet card), a communication port, an antenna with associated circuitry and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

Optionally, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage unit 818, removable storage unit 822, a hard disk installed in hard disk drive 812, or a carrier wave carrying software over communication path 826 (wireless link or cable) to communication interface 824. Computer readable storage media refers to any non-transitory tangible storage medium that provides recorded instructions and/or data to the computing device 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets including e-mail transmissions and information recorded on Websites and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the hard disk drive 812, or the interface 820. Alternatively, the computer program product may be downloaded to the computer system 800 over the communications path 826. The software, when executed by the processor 804, causes the computing device 800 to perform functions of embodiments described herein.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

The techniques described in this specification produce one or more technical effects. As mentioned above, embodiments of the present application provide approaches that emphasize on visual content of images to evaluate intrinsic popularity and thereby advantageously provide a more accurate popularity prediction for images.

Furthermore, such an accurate intrinsic popularity evaluation in turn advantageously serves as a guidance to optimize content compression, thereby facilitates a more efficient computational and/or storage resource management for various social networks.

FIGS. 9 to 12 depict experimental data that proves effectiveness of the methods and devices for intrinsic popularity evaluation and for content compression as described herein. The experimental data shows that the embodiments described herein produce a more accurate popularity evaluation which facilitates a more efficient computational and/or storage resource management for various social networks based on the intrinsic popularity evaluation. Details of the experimental data are as follows.

Figure 9:
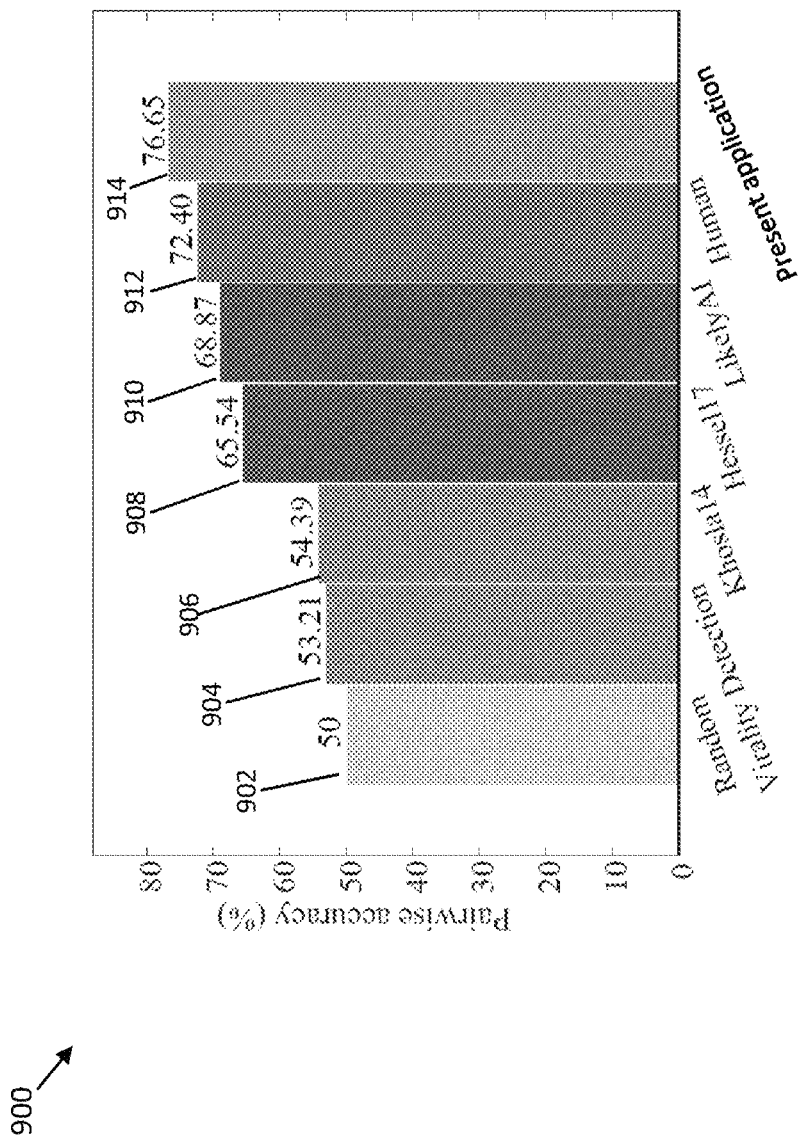
FIGS. 9 to 12 depict experimental data that proves effectiveness of the methods and devices for intrinsic popularity evaluation and for content compression as described herein. The experimental data shows that the embodiments described herein produce a more accurate popularity evaluation which facilitates a more efficient computational and/or storage resource management for various social networks based on the intrinsic popularity evaluation. Details of the experimental data are as follows.

FIG. 9 shows a diagram 900 depicting accuracy of popularity evaluation conducted on a testing set of popularity-discriminable image pairs (PDIPs) based on various popularity evaluation methods. The various popularity evaluation methods include random evaluation 902, virality detection 904, Khosla14 906, Hessel17 908, LikelyAI 910, human evaluation 912, and the intrinsic popularity evaluation 914 of the present application. It is shown that the intrinsic popularity evaluation 914 as described in the present application has achieved a highest accuracy at 76.65% while the random evaluation 902 achieves an accuracy at 50%, the virality detection 904 at 53.21%, the Khosla14 906 at 54.39%, the Hessel17 908 at 65.54%, the LikelyAI 910 at 68.87%, and the human evaluation 912 at 72.40%.

Figure 10:
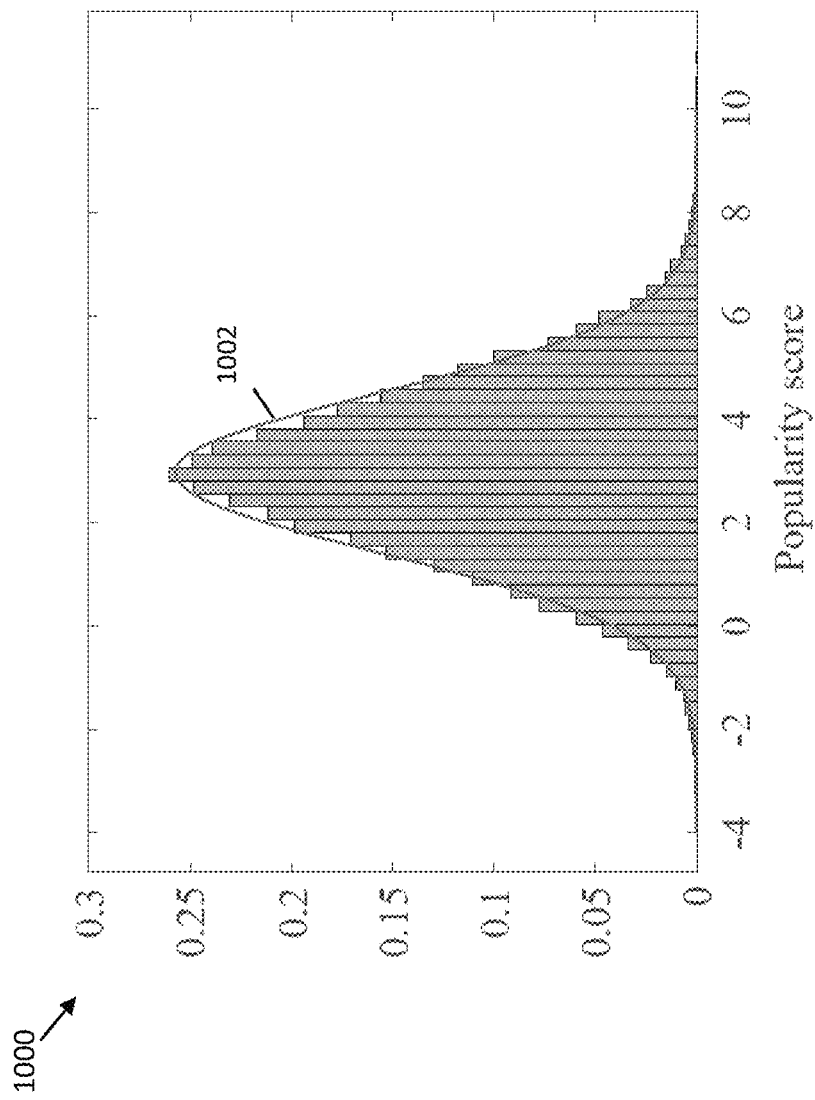

FIG. 10 shows a diagram 1000 depicting a normalised histogram of intrinsic popularity scores for a testing set of 5000 popularity-discriminable image pairs (PDIPs) based on the method of intrinsic popularity evaluation according to an embodiment. It is shown that the normalised histogram of the intrinsic popularity scores fits into a Gaussian curve 1002.

Figure 11:
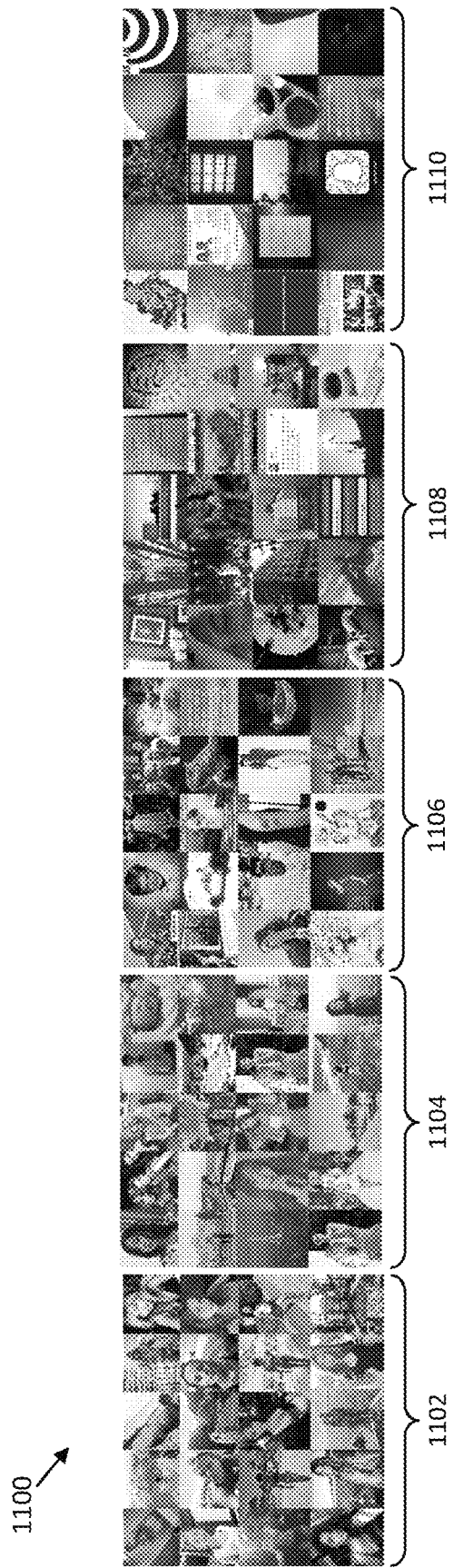

FIG. 11 shows examples of images with different intrinsic popularity levels. For the sake of simplicity, some images are resized without keeping aspect ratios for neat display. In an embodiment, the respective intrinsic popularity scores of these images determined by the methods of intrinsic popularity evaluation as described herein are classified into five (5) intrinsic popularity levels: (a) excellent, (b) good, (c) fair, (d) bad, and (e) poor. For example, the excellent level may cover an intrinsic popularity score range of 6 and above. The good level may cover an intrinsic popularity score range of 4 to 6. The fair level may cover an intrinsic popularity score range of 2-4. The bad level may cover an intrinsic popularity score range of 0 to 2. The poor level may cover an intrinsic popularity score range of 0 and below. It is appreciable to those skilled in the art that the intrinsic popularity score ranges described above are for exemplary purposes. The intrinsic popularity score ranges may vary based on practical needs and requirements.

Figure 12:
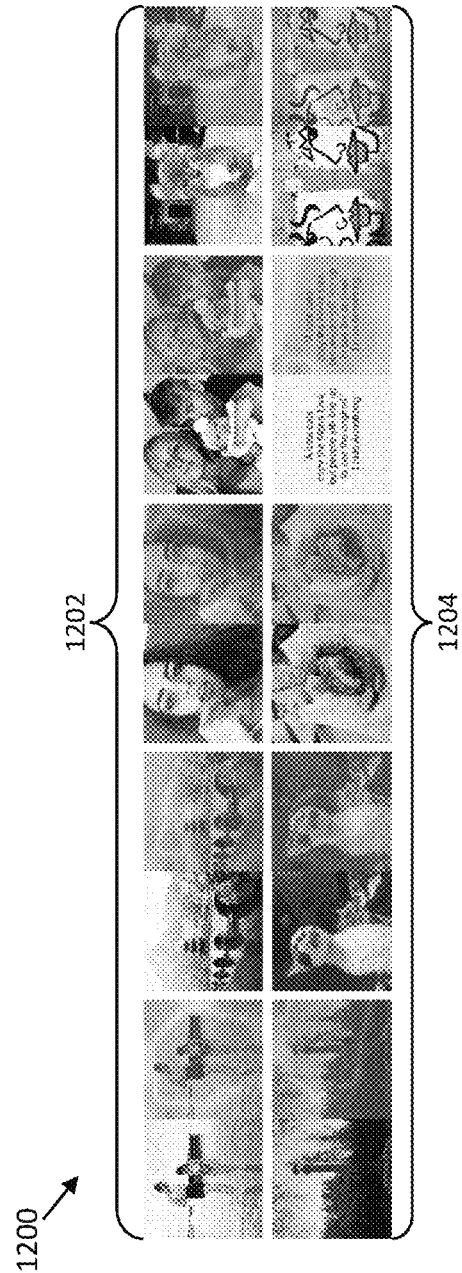

FIG. 12 shows a diagram 1200 depicting heatmaps of sample images generated by Grad-CAM. In the diagram 1200, a front row 1202 shows images of high intrinsic popularity, e.g. with intrinsic popularity scores in a range of 4 and above. A second row 1204 shows images of low intrinsic popularity, e.g. with intrinsic popularity scores in a range of 2 and below. It is shown from the diagram 1200 that a warmer region in a visual content of an image contributes more to the image's intrinsic popularity.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

Based on the embodiments disclosed above, the present disclosure provides the following.

A first aspect of the present disclosure provides a method of intrinsic popularity evaluation. The method comprises: receiving an image from a social network; and determining an intrinsic popularity score for the image using a DNN based intrinsic popularity assessment model.

In certain embodiments, the method further comprises training the DNN based intrinsic popularity assessment model. In particular, the training comprises: retrieving a plurality of historical images; constructing a plurality of PDIPs based on the plurality of historical images, wherein each PDIP comprises a first image and a second image, the first image having a probability of higher intrinsic popularity than the second image; and training the DNN based intrinsic popularity assessment model with the plurality of PDIPs.

In certain embodiments, the training of the DNN based intrinsic popularity assessment model with the plurality of PDIPs comprises: for each PDIP of the plurality of PDIPs, determining a first intrinsic popularity score for the first image and a second intrinsic popularity score for the second image using the DNN based intrinsic popularity assessment model, and optimising the DNN based intrinsic popularity assessment model by minimizing a binary cross entropy loss between a score difference between the first intrinsic popularity score and the second intrinsic popularity score and a ground truth binary label denoting whether the first image is intrinsically more popular than the second image.

In certain embodiments, the intrinsic popularity score for the image is associated with a visual content of the image.

In certain embodiments, the intrinsic popularity score for the image is further associated with one or more attributes of the image, the one or more attributes including: upload/download time; post URL; user ID; type of the visual content; caption content, and/or number of comments.

A second aspect of the present disclosure provides a method of content compression. The method comprises compressing information with a variable compression rate corresponding to an intrinsic popularity score of a content of the information.

In certain embodiments, the content of the information comprises an image.

In certain embodiments, the method further comprises determining the intrinsic popularity score of the image using a deep neural network (DNN) based intrinsic popularity assessment model.

In certain embodiments, the compressing of the information comprises: classifying the intrinsic popularity score into a popularity level; and compressing the image with the variable compression rate, the variable compression rate corresponding to the popularity level, wherein the variable compression rate is in a negative correlation to the corresponding intrinsic popularity score.

In certain embodiments, the variable compression rate of the image is achieved based on a popularity based conditional convolution CConv: CConv=W(s)×Conv+b(s), wherein W(s)=softplus(u×s) and b(s)=v×s, and wherein s is the popularity level of the image encoded by a one-hot vector, W(s) is a channel-wise scaling factor performed on a general convolution (Conv), b(s) is a bias term performed on the general convolution (Conv), and u and v are learnable weights of fully connected layers in a DNN based autoencoder.

A third aspect of the present disclosure provides a device for intrinsic popularity evaluation. The device comprises: at least one processor; and a memory including computer program code for execution by the at least one processor. The computer program code instructs the at least one processor to: receive an image from a social network; and determine an intrinsic popularity score for the image using a DNN based intrinsic popularity assessment model.

In certain embodiments, the computer program code further instructs the at least one processor to: train the DNN based intrinsic popularity assessment model. During the training the computer program code further instructs the at least one processor to: retrieve a plurality of historical images; construct a plurality of popularity-discriminable image pairs (PDIPs) based on the plurality of historical images, wherein each PDIP comprises a first image and a second image, the first image having a probability of higher intrinsic popularity than the second image; and train the DNN based intrinsic popularity assessment model with the plurality of PDIPs.

In certain embodiments, during the training of the DNN based intrinsic popularity assessment model with the plurality of PDIPs, the computer program code instructs the at least one processor to: for each PDIP of the plurality of PDIPs, determine a first intrinsic popularity score for the first image and a second intrinsic popularity score for the second image using the DNN based intrinsic popularity assessment model, and optimise the DNN based intrinsic popularity assessment model by minimizing a binary cross entropy loss between a score difference between the first intrinsic popularity score and the second intrinsic popularity score and a ground truth binary label denoting whether the first image is intrinsically more popular than the second image.

In certain embodiments, the intrinsic popularity score for the image is associated with a visual content of the image.

In certain embodiments, the intrinsic popularity score for the image is further associated with one or more attributes of the image. The one or more attributes include: upload/download time; post URL; user ID; type of the visual content; caption content; and/or number of comments.

A fourth aspect of the present disclosure provides a device for content compression. The device comprises: at least one processor configurable to allocate resources; and a memory including computer program code for execution by the at least one processor. The computer program code instructs the at least one processor to allocate resources by compressing information with a variable compression rate corresponding to an intrinsic popularity score of a content of the information.

In certain embodiments, the allocated resources include storage space.

In certain embodiments, the content of the information comprises an image.

In certain embodiments, the computer program code further instructs the at least one processor to determine the intrinsic popularity score of the image using a DNN based intrinsic popularity assessment model.

In certain embodiments, during the compressing of the information, the computer program code further instructs the at least one processor to: classify the intrinsic popularity score into a popularity level; and compress the image with the variable compression rate, the variable compression rate corresponding to the popularity level, wherein the variable compression rate is in a negative correlation to the corresponding intrinsic popularity score.

In certain embodiments, the computer program code further instructs the at least one processor to achieve the variable compression rate of the image based on a popularity based conditional convolution CConv: CConv=W(s)×Conv+b(s), wherein W(s)=softplus(u×s) and b(s)=v×s, and wherein s is the popularity level of the image encoded by a one-hot vector, W(s) is a channel-wise scaling factor performed on a general convolution (Conv), b(s) is a bias term performed on the general convolution (Conv), and u and v are learnable weights of fully connected layers in a DNN based autoencoder.

A fifth aspect of the present disclosure provides a device for content compression. The device comprises: a core autoencoder including an analysis transformation and a synthesis transformation to learn a quantized latent representation of a content of information; and a hyper autoencoder arranged to learn a probabilistic model over the quantized latent representation of the content learned in the core autoencoder; wherein the content is processed by both the core autoencoder and the hyper autoencoder to generate a compressed content of the information, and wherein the core autoencoder and the hyper autoencoder are composed of multiple layers of conditional convolution, generalized divisive normalization (GDN), and inverse GDN, wherein the multiple layers of conditional convolution are conditioned on an intrinsic popularity score of the content of the information determined using a deep neural network (DNN) based intrinsic popularity assessment model.

In certain embodiments, the content of the information comprises an image.

A sixth aspect of the present disclosure provides a non-transitory computer readable storage medium having instructions encoded thereon that, when executed by a processor, cause the processor to perform one or more steps in a method of intrinsic popularity evaluation according to any one of the embodiments disclosed in the first aspect of the present disclosure.

A seventh aspect of the present disclosure provides a non-transitory computer readable storage medium having instructions encoded thereon that, when executed by a processor, cause the processor to perform one or more steps in a method of intrinsic popularity evaluation according to any one of the embodiments disclosed in the second aspect of the present disclosure.

What is claimed is:

1. A method of content compression, the method comprising:
    compressing information with a variable compression rate corresponding to an intrinsic popularity score of a content of the information, wherein the content of the information comprises an image; and
    before the information is compressed, determining the intrinsic popularity score of the image using a deep neural network (DNN) based intrinsic popularity assessment model;
    wherein the compressing of the information comprises:
        classifying the intrinsic popularity score into a popularity level; and
        compressing the image with the variable compression rate, the variable compression rate corresponding to the popularity level, the variable compression rate being in a negative correlation to the corresponding intrinsic popularity score, wherein the image is compressed by using a DNN based autoencoder, the DNN based autoencoder comprising learnable weights, the learnable weights being learnt according to an objective function $\mathbb{E}$ given by $\mathbb{E} = \mathbb{E}_r + \lambda \mathbb{E}_d$, where $\mathbb{E}_r$ is a coding cost, $\mathbb{E}_d$ is a reconstruction error, and $\lambda$ is a Lagrange multiplier for controlling rate-distortion trade-off, and wherein A is a monotonic increasing function of the popularity level such that more bits are allocated for more popular images to thereby enable the image to be compressed with the variable compression rate corresponding to the popularity level and in the negative correlation to the corresponding intrinsic popularity score.

2. The method according to claim 1, further comprising:
    training the DNN based intrinsic popularity assessment model, wherein the training comprises:
        retrieving a plurality of historical images;
        constructing a plurality of popularity-discriminable image pairs (PDIPs) based on the plurality of historical images, wherein each PDIP comprises a first image and a second image, the first image having a probability of higher intrinsic popularity than the second image; and
        training the DNN based intrinsic popularity assessment model with the plurality of PDIPs.

3. The method according to claim 2, wherein the training of the DNN based intrinsic popularity assessment model with the plurality of PDIPs comprises:
    for each PDIP of the plurality of PDIPs,
        determining a first intrinsic popularity score for the first image and a second intrinsic popularity score for the second image using the DNN based intrinsic popularity assessment model, and
        optimising the DNN based intrinsic popularity assessment model by minimizing a binary cross entropy loss between a score difference between the first intrinsic popularity score and the second intrinsic popularity score and a ground truth binary label denoting whether the first image is intrinsically more popular than the second image.

4. The method according to claim 1, wherein the intrinsic popularity score for the image is associated with a visual content of the image.

5. The method according to claim 4, wherein the intrinsic popularity score for the image is further associated with one or more attributes of the image, the one or more attributes including:
    upload/download time,
    post URL,
    user ID,
    type of the visual content,
    caption content, and/or
    number of comments.

6. A device for content compression, the device comprising:
    at least one processor configurable to allocate resources; and
    a memory including computer program code for execution by the at least one processor, wherein the computer program code instructs the at least one processor to allocate resources by:
    compressing information with a variable compression rate corresponding to an intrinsic popularity score of a content of the information, wherein the content of the information comprises an image; and
    before the information is compressed, determining the intrinsic popularity score of the image using a deep neural network (DNN) based intrinsic popularity assessment model;
    wherein the compressing of the information comprises:
        classifying the intrinsic popularity score into a popularity level; and
        compressing the image with the variable compression rate, the variable compression rate corresponding to the popularity level, the variable compression rate being in a negative correlation to the corresponding intrinsic popularity score, wherein the image is compressed by using a DNN based autoencoder, the DNN based autoencoder comprising learnable weights, the learnable weights being learnt according to an objective function $\mathbb{E}$ given by $\mathbb{E} = \mathbb{E}_r + \lambda \mathbb{E}_d$, where $\mathbb{E}_r$ is a coding cost, $\mathbb{E}_d$ is a reconstruction error, and $\lambda$ is a Lagrange multiplier for controlling rate-distortion trade-off, and wherein $\lambda$ is a monotonic increasing function of the popularity level such that more bits are allocated for more popular images to thereby enable the image to be compressed with the variable compression rate corresponding to the popularity level and in the negative correlation to the corresponding intrinsic popularity score.

7. The device according to claim 6, wherein the computer program code further instructs the at least one processor to:

train the DNN based intrinsic popularity assessment model, wherein during the training the computer program code further instructs the at least one processor to:
  retrieve a plurality of historical images;
  construct a plurality of popularity-discriminable image pairs (PDIPs) based on the plurality of historical images, wherein each PDIP comprises a first image and a second image, the first image having a probability of higher intrinsic popularity than the second image; and
  train the DNN based intrinsic popularity assessment model with the plurality of PDIPs.

8. The device according to claim 7, wherein during the training of the DNN based intrinsic popularity assessment model with the plurality of PDIPs, the computer program code instructs the at least one processor to:
  for each PDIP of the plurality of PDIPs,
    determine a first intrinsic popularity score for the first image and a second intrinsic popularity score for the second image using the DNN based intrinsic popularity assessment model, and
    optimise the DNN based intrinsic popularity assessment model by minimizing a binary cross entropy loss between a score difference between the first intrinsic popularity score and the second intrinsic popularity score and a ground truth binary label denoting whether the first image is intrinsically more popular than the second image.

9. The device according to claim 6, wherein the DNN based autoencoder comprises:
  a core autoencoder including an analysis transformation and a synthesis transformation to learn a quantized latent representation of a content of information; and
  a hyper autoencoder arranged to learn a probabilistic model over the quantized latent representation of the content learned in the core autoencoder;
  wherein the content is processed by both the core autoencoder and the hyper autoencoder to generate a compressed content of the information, and
  wherein the core autoencoder and the hyper autoencoder are composed of multiple layers of conditional convolution, generalized divisive normalization (GDN), and inverse GDN, wherein the multiple layers of conditional convolution are conditioned on an intrinsic popularity score of the content of the information determined using a deep neural network (DNN) based intrinsic popularity assessment model.

\* \* \* \* \*